United States Patent
Songa et al.

(10) Patent No.: US 10,600,325 B1
(45) Date of Patent: Mar. 24, 2020

(54) AVIONIC DISPLAY SYSTEM

(71) Applicant: HONEYWELL INTERNATIONAL INC., Morris Plains, NJ (US)

(72) Inventors: Anil Kumar Songa, Karnataka (IN); Mohammed Ibrahim Mohideen, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 16/196,706

(22) Filed: Nov. 20, 2018

(51) Int. Cl.
*G08G 5/00* (2006.01)
*B64D 43/00* (2006.01)
*B64D 47/08* (2006.01)
*G01C 23/00* (2006.01)
*G06T 11/00* (2006.01)
*G02B 27/01* (2006.01)

(52) U.S. Cl.
CPC ........... *G08G 5/0021* (2013.01); *B64D 43/00* (2013.01); *B64D 47/08* (2013.01); *G01C 23/00* (2013.01); *G02B 27/0172* (2013.01); *G06T 11/001* (2013.01); *G02B 2027/014* (2013.01); *G02B 2027/0112* (2013.01); *G02B 2027/0138* (2013.01)

(58) Field of Classification Search
CPC .............................. G08G 5/0021; G06T 19/006
USPC .......................................................... 345/633
See application file for complete search history.

(56) References Cited

U.S. PATENT DOCUMENTS

| | | | |
|---|---|---|---|
| 8,400,330 B2 | 3/2013 | He et al. | |
| 8,654,149 B2 | 2/2014 | He | |
| 9,390,559 B2 | 7/2016 | Feyereisen et al. | |
| 9,407,826 B1 | 8/2016 | Tiana | |
| 9,494,447 B2 | 11/2016 | He et al. | |
| 2007/0252749 A1 | 11/2007 | Blaskovich et al. | |
| 2010/0026525 A1* | 2/2010 | Feyereisen | G01C 5/005 340/972 |
| 2012/0026190 A1* | 2/2012 | He | G01C 21/00 345/633 |
| 2012/0081236 A1* | 4/2012 | Best | G02B 27/0093 340/945 |
| 2012/0133529 A1* | 5/2012 | He | G01C 23/00 340/977 |
| 2015/0169191 A1 | 6/2015 | Maji et al. | |

FOREIGN PATENT DOCUMENTS

EP 3113470 A1 1/2017

* cited by examiner

*Primary Examiner* — Shivang I Patel
(74) *Attorney, Agent, or Firm* — Lorenz & Kopf, LLP

(57) ABSTRACT

Avionic display systems systems generally relate to techniques of displaying images to a pilot, by generating a translucent image to be overlaid on top of a pilot view; determining if the pilot view includes one or more locations of stored visual references including sources of color-based information; overlaying; the translucent image on top of the pilot view; and modifying the translucent image to convey the color-based information to the pilot.

16 Claims, 7 Drawing Sheets

AVIONIC DISPLAY SYSTEM

TECHNICAL FIELD

The present disclosure generally relates to avionic display systems, and more particularly relates to an avionic display system which includes one or more vision systems.

BACKGROUND

Aircraft display systems are used in many modern aircraft in order to assist the pilot in performing various tasks. Modern displays include near-to-eye (NTE) displays, such as head mounted displays (HMDs), which may form part of a pilot helmet; head-up displays (HUDs) and other types of display where the pilot is able to view the surrounding environment through the display itself.

Display systems may present "enhanced" information to the pilot using a vision system (VS). More specifically, vision systems allow for the presentation of information to the pilot that is otherwise not easily visible by the pilot. One such example of a vision system is an Enhanced Vision System (EVS). Enhanced vision systems typically overlay an image onto an environmental view seen by the pilot in order to present information to the pilot that would otherwise not be visible by the pilot due to, for example, low-light conditions or adverse weather conditions. Typically, the EVS overlays information onto a view of the environment external to the aircraft as seen by the pilot through the NTE display. Some examples of the types of information that can be presented to a pilot via an EVS include a night-vision image stream captured using an Infra-Red (IR) camera or a thermal image stream captured using a thermal imaging camera. The captured image stream of the EVS is overlaid on top of the environmental view seen by the pilot through the NTE display.

Another example of a vision system is a synthetic vision system (SVS). A synthetic vision system may overlay computer-generated images onto the environmental view of the pilot. These computer-generated images may be translucent, such that the pilot is able to view the external environment through the overlaid image whilst still having the benefit of the information presented by the computer-generated image. For example, the computer-generated images may present information about airport features (such as runway locations, aircraft building locations) or terrain features (such as hazardous or high-altitude terrain) to the pilot that may otherwise not be visible to the pilot due to, for example, poor visibility conditions. Still other types of vision systems are known, such as combined EVS/SVS vision systems.

In conventional vision systems, the overlaid images are typically monochrome. For example, in the case of an overlaid EVS image presenting night-vision images to the pilot, a green monochrome night-vision image may be overlaid on top of the environmental view seen by the pilot through the NTE display.

In some situations, color-based information shown in the pilot's environmental view may be used by the pilot to make a decision (for example, to allow the pilot to distinguish between runways lit by white lighting and taxiways lit by blue and/or green lighting). In these situations, the monochrome images overlaid by the vision system may obscure the color-based information presented to the pilot from these sources of color-based information, and the pilot may have to switch-off the vision system in order to obtain this color-based information.

Accordingly, it would be desirable to decrease the likelihood that color-based information is obscured by vision systems shown on an aircraft display. Other desirable features and characteristics will become apparent from the subsequent detailed description and appended claims.

BRIEF SUMMARY

This summary is provided to introduce a selection of concepts in a simplified form that are further described below in the detailed description section.

In an exemplary embodiment, there is provided an avionic display system. The avionic display system includes a display module for displaying an image overlaid on a pilot view. The avionic display system also includes vision system in operable communication with the display module, the vision system configured to generate a translucent image and to cause the display to overlay the generated translucent image on the pilot view. The avionic display system also includes a navigation database in operable communication with the vision system, the navigation database storing information related to a location and boundary of a visual reference in the pilot view that would otherwise be obscured by the overlaid image, the visual reference comprising a source of color-based information. The vision system is configured to, using the information related to the location, the boundary and/or the color of the visual reference, modify the generated translucent image in the pilot view to convey the color-based information to the pilot.

In another exemplary embodiment, there is provided a method of displaying images to a pilot, comprising: generating, using a processor, a translucent image to be overlaid on top of a pilot view; determining, using a processor, if the pilot view includes one or more locations of stored visual references including sources of color-based information; overlaying; using a processor, the translucent image on top of the pilot view; and modifying the translucent image to convey the color-based information to the pilot.

In another exemplary embodiment, there is provided a method of displaying images to a pilot. The method includes the step of generating, using a processor, a translucent image to be overlaid on top of a pilot view. The method also includes the step of identifying, using a processor, one or more visual references including sources of color-based information in the pilot view. The method also includes the step of determining, using a processor, the locations of the identified visual references in the pilot view. The method also includes the step of overlaying; using a processor, the translucent image on top of the pilot view. The method also includes the step of modifying the translucent image to convey the color-based information to the pilot.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. There is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines and arrows shown in the various figures contained herein are intended to represent example functional relationships and/or physical couplings between the various elements. It should be noted that many alternative or additional functional relationships or physical connections may be present in an embodiment of the present disclosure.

Figure 1:
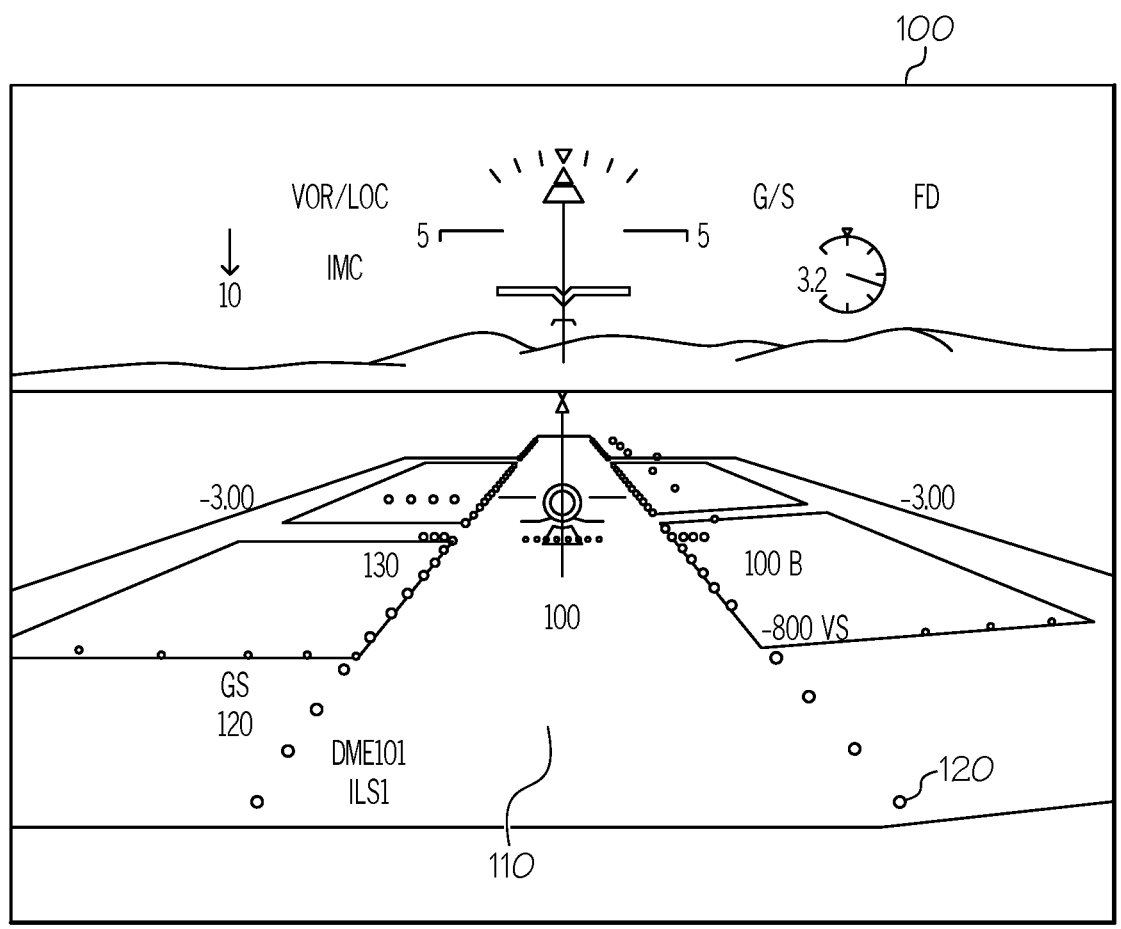
FIG. 1 shows a conventional image generated by a vision system.

FIG. 1 shows an exemplary image 100 generated by a conventional aircraft display system incorporating a vision system. In the image 100, a monochrome image, such as an IR "night-vision" image, is generated by a vision system, such as an EVS, and is then overlaid on top of an environmental view of the pilot as seen through a NTE display. The monochrome image is translucent, such that the pilot may see the terrain underlying the overlaid image and also the information presented by the monochrome image.

As can be seen in FIG. 1, the environmental view of the pilot includes a runway 110 and one or more visual references including color-based information, the visual reference being exemplified in FIG. 1 by runway lighting 120. In reality, airport runway lighting 120 has a white color to indicate the boundaries of the runway to the pilot and also to indicate to the pilot that the delineated boundaries are of a runway and not (for example) a taxiway, which might instead be indicated using green or blue lighting. However, because the monochrome translucent image from the vision system is overlaid on top of the environmental view, the pilot is unable to view the "white" color information of the runway lighting 120. As such, the pilot may have difficulty in distinguishing whether the lights delineate a runway (with white lighting); a taxiway (which is normally delineated with green or blue lighting); or in-pavement lighting (which is normally red). In order to obtain the color-based information from the visual reference of the airport lighting, the pilot must deactivate the vision system to view this color-based information, thereby increasing pilot workload at a time (landing) when pilot workload is already high.

It will be appreciated that this above-described problem can be experienced with any type of vision system image which is overlaid on top of a visual reference in the pilot view in a manner that would obscure color-based information to the pilot.

Figure 2:
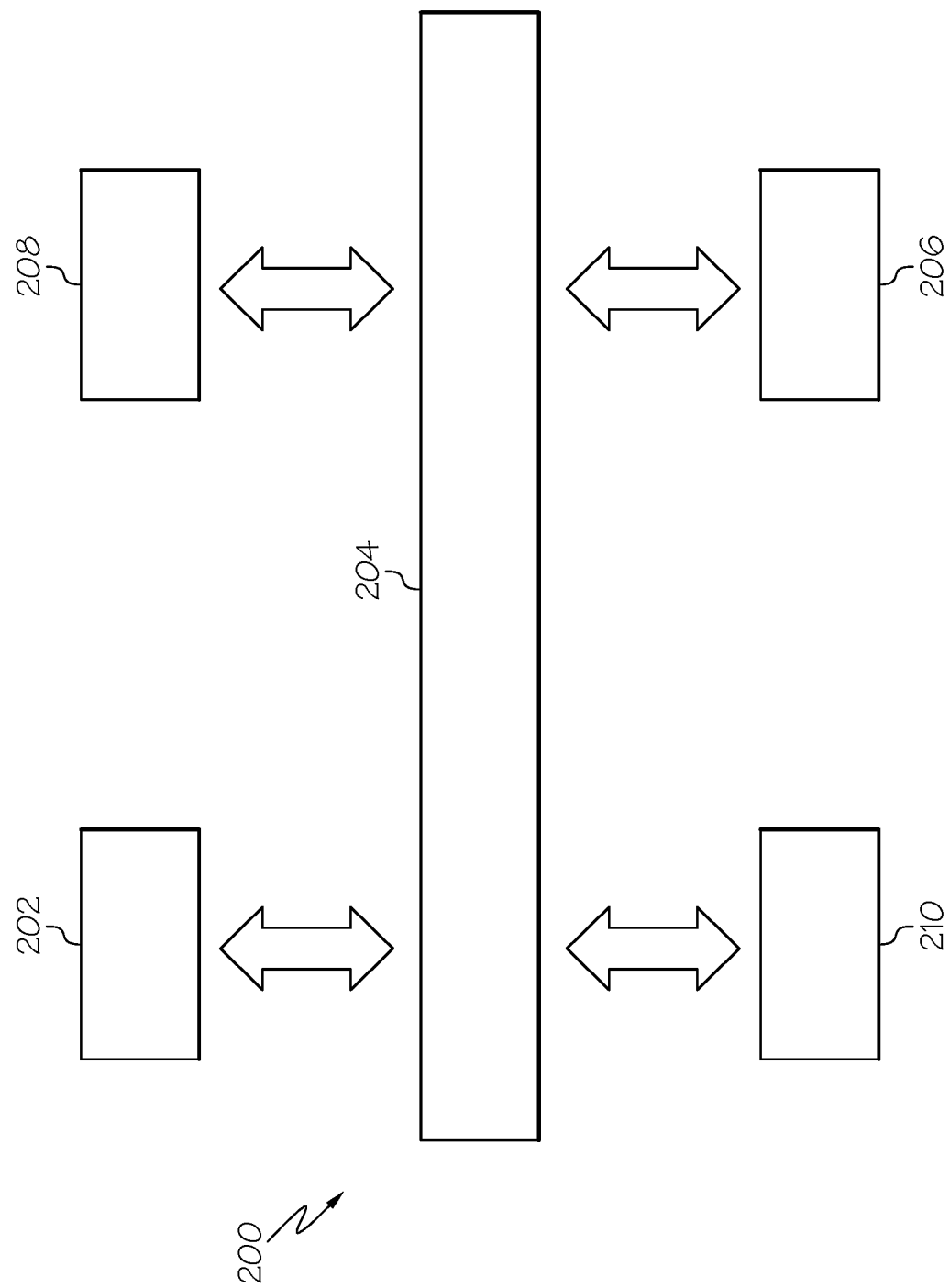
FIG. 2 shows a schematic of an aircraft display system in accordance with various embodiments.

FIG. 2 shows a functional schematic of an avionic display system 200 in accordance with various embodiments. Outlined arrows in this figure are used to show operable connections between the various elements shown in this figure.

In exemplary embodiments, the avionic display system 200 includes a navigation database 202. The navigation database 202 is configured to store information relating to the location of one or more visual references that may provide color-based information to the pilot. The information stored in the navigation database includes information related to one or more of a location of each visual reference, a boundary defining the extent of the location of each respective visual reference, and a color of each respective visual reference. In exemplary embodiments, the navigation database 202 stores the locations, boundaries and colors of airport runway lighting. For example, the navigation database 202 may store the location and color (typically white) associated with the runway lighting of a particular airport. Additionally and/or alternatively, the navigation database 202 is configured to store the locations, boundaries and colors of taxiway lighting; in-pavement airport lighting; and other sources of color-based information.

In exemplary embodiments, the navigation database 202 is configured to be updated when new visual references of interest are constructed. The updating of the navigation database 202 may be performed manually by a pilot or technician or may be performed automatically when a list of visual references is updated in a central server and a data transfer connection is formed between the navigation database 202 and this central server. For example, when a new visual reference of interest is constructed (such as new airport lighting being constructed at a particular airport), the location, boundary and color of this new visual reference is included in the navigation database 202 when the navigation database 202 is updated.

The avionic display system 200 further includes at least one vision system 204. In exemplary embodiments, the at least one vision system 204 comprises at least one of an enhanced vision system (EVS) or a synthetic vision system (SVS), or a combination of an enhanced vision system and a synthetic vision system. The at least one vision system 204 includes one or more processors, such as graphical processors. The at least one vision system 204 is configured to generate images to be displayed to the pilot in an overlaid manner on the pilot's view, as will be explained in further detail below.

The avionic display system 200 further includes a display module 206 configured to display the images generated by the at least one vision system 204. In exemplary embodiments, the display module 206 comprises a near-to-eye (NTE) display, such as a head-mounted display (HMD) or a heads-up display (HUD), and the images presented to the pilot are overlaid on top of an environmental view seen by the pilot through the NTE display. The overlaid images are typically monochrome in color. In another exemplary embodiment, the display module 206 comprises a Head Down Display (HDD).

In exemplary embodiments, the at least one vision system 204 is configured to generate an image to be displayed on the display module 206 independently of the other systems and modules shown in FIG. 2. For example, the at least one vision system 204 may generate an image on the basis of a sensor 208, such as a night-vision or thermal camera mounted on the aircraft. In additional or alternative exemplary embodiments, the at least one vision system 204 may generate an image on the basis of information obtained from the navigation database 202. For example, the at least one vision system 204 may obtain information related to a visual reference location, such as a runway of the airport. The at least one vision system 204 is then configured, on the basis of the location of the stored visual reference and an image source (for example, an image obtained from a "low-light" IR camera), to perform an object recognition algorithm to thereby determine the location of the airport feature in the pilot's view through the display. The at least one vision system 204 is then configured to overlay a translucent computer-generated image representative of the airport feature in the pilot's view on the display module, in the form of an "augmented reality" view, to highlight the location of the airport feature to the pilot. In this manner, the pilot is able to locate the airport feature through the assistance of the image shown on the display module 206 even in low-light or poor weather conditions.

In exemplary embodiments, the overlaid images may be automatically adjusted based on weather condition information obtained via a receiver module 210 from external sources, such as ground stations. In particular, the at least one vision system 204 is configured to vary the degree of translucency of the overlaid images based on received weather conditions, with a less translucent (and therefore more easily recognizable) image being overlaid onto the pilot view in poorer visibility conditions (for example, during rain or fog) and a more translucent image being overlaid in better visibility conditions.

In use, after generating an image to be overlaid onto the pilot's view via the display module 206, the at least one vision system 204 is configured to cross-reference the features detected by the object recognition algorithm to the information stored in the database related to the locations of visual references of color-based information sources in order to determine if any color-based information is being obscured in the pilot view as a result of the overlaid images. The at least one vision system 204 is then configured to modify the generated image in some manner in order to convey the color-based information to the pilot.

In exemplary embodiments, the at least one vision system 204 is configured to identify any visual references comprising color-based information in the pilot view and to then modify the generated image by disabling the overlaying of the translucent image over the locations of these visual references in the pilot view on the display module 206. The area over which the overlaid image may be disabled can be defined by the location and boundary information stored in the navigation database associated with the identified visual reference.

In an alternative embodiment, the navigation database 202 does not include stored information relating to the location of one or more visual references that may provide color-based information to the pilot. In this alternative exemplary embodiment, the at least one vision system does not cross-reference the features detected by the object recognition algorithm to any stored information. Instead, the object recognition algorithm determines the color-based information based on the recognition of the object, and the at least one vision system 204 is configured to modify the overlaid images based on the recognition of the object. In this manner, it is possible to ensure that color-based information from dynamic objects, such as other aircraft, is not obscured in the pilot view. For example, the object recognition algorithm may identify an object in the pilot view as being runway lighting. On the basis of this identification, the at least one vision system 204 is configured to modify the overlaid image to convey the color-based information associated with the runway lighting to the pilot without cross-referencing the location of the identified object to location and boundary information stored in the navigation database 202. Instead, the overlaid image may be modified based on information obtained from airport ground systems and/or based on information obtained from on-board sensors.

Figure 3:
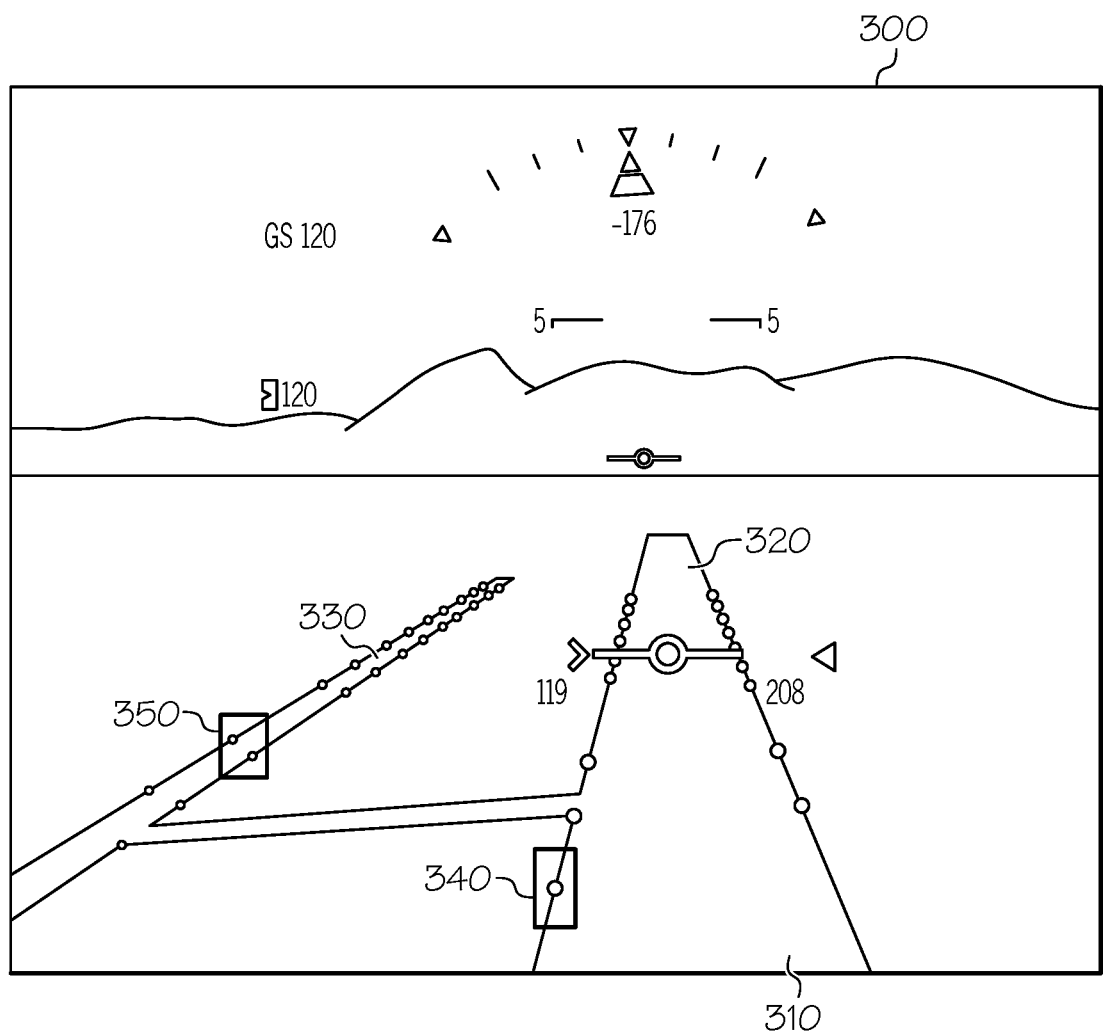
FIG. 3 shows a representative image displayed by an aircraft display system in accordance with various embodiments.

A representative image 300 produced by the avionic vision system in accordance with various exemplary embodiments is shown in FIG. 3. As can be seen in FIG. 3, the representative image 300 includes a runway 310, runway lighting 320 and taxiway lighting 330. In the image 300, the runway lighting 320 and taxiway lighting 330 are each recognized by the at least one vision system as constituting visual references that include color-based information on the basis of corresponding visual reference location information stored in the navigation database, and therefore areas of the overlaid image are selectively omitted. In particular, the bounded areas 340 and 350 are omitted from the image, these areas 340, 350 being defined by the location and boundary information associated with the runway lighting 320 and taxiway lighting 330, respectively, stored in the navigation database.

By modifying the image by selectively omitting the areas 340 and 350 in the image overlaid on the pilot view, the pilot is therefore able to view the color-based information presented by the visual references 320, 330 without these visual references being obscured by the overlaid images and also without having to disable the displaying of the remaining overlaid images. In this manner, the pilot is able to benefit from both of the color-based information presented by the visual references 320, 330 (in this case the runway lighting and the taxiway lighting) and also the information shown in the overlaid image generated by the at least one vision system 204. The pilot is therefore able to make informed decisions about how to maneuver the aircraft on the basis of both of these sources of information without an increase in workload.

Figure 4B:
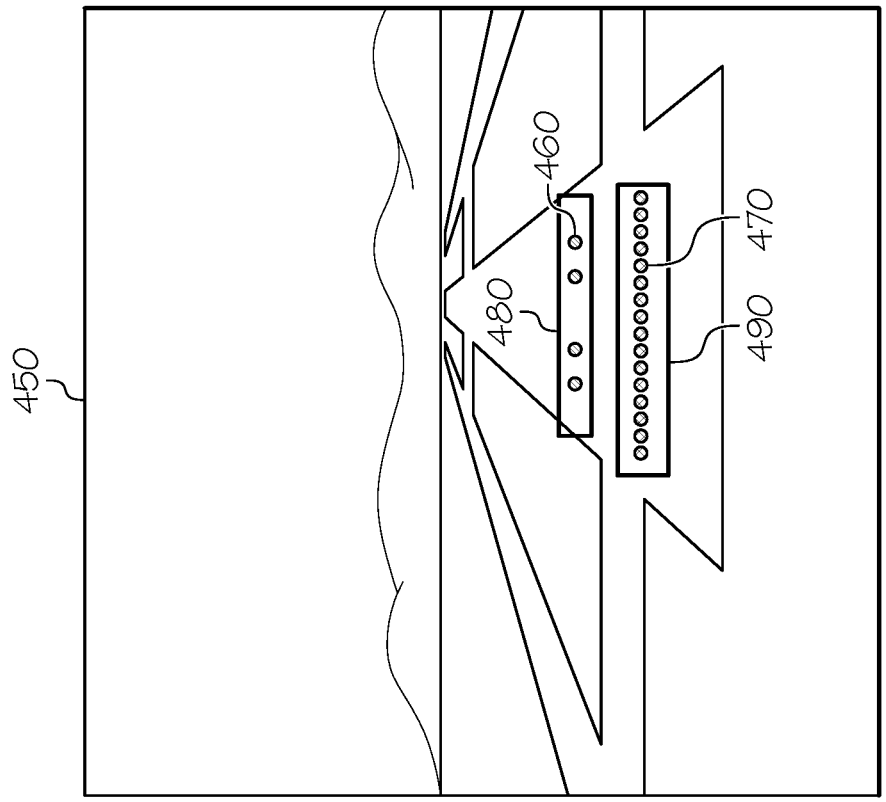
FIGS. 4A and 4B show a comparison between a conventional image generated by a vision system (FIG. 4A) and an image generated by a vision system of an aircraft display system in accordance with exemplary embodiments (FIG. 4B)
Figure 4A:
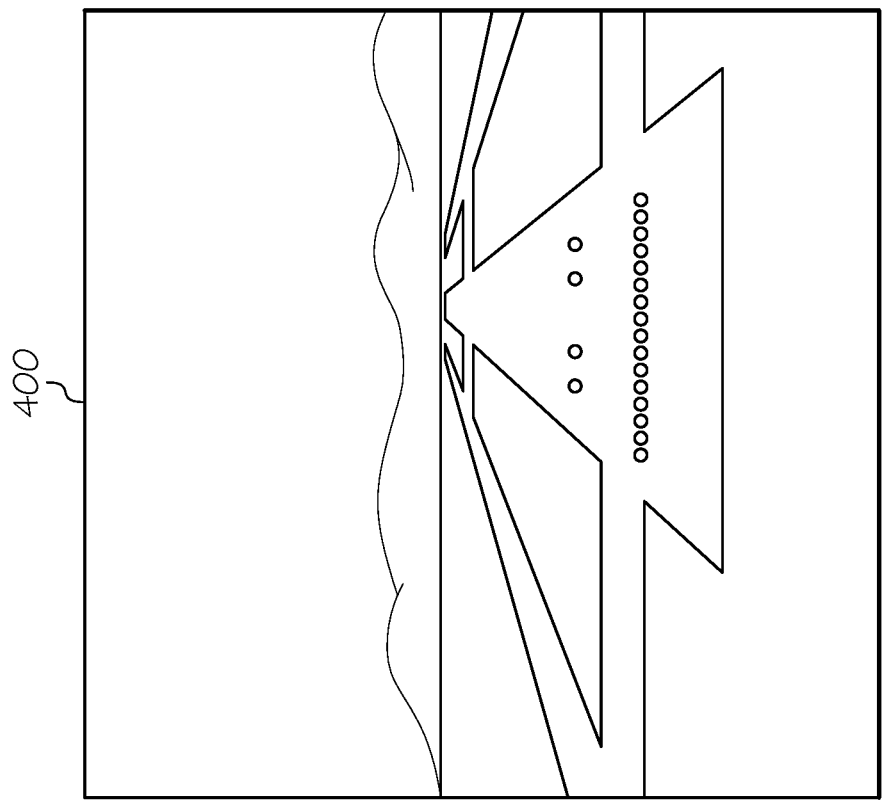

FIG. 4 shows a comparison between a conventional image 400 generated by a conventional aircraft display system and an image 450 generated by an aircraft display system in accordance with exemplary embodiments. As can be seen in FIG. 4, in the conventional image 400, any visual references showing color-based information are obscured by overlaid images generated by the vision system. As can also be seen in FIG. 4, in the image 450 generated by an aircraft display system in accordance with exemplary embodiments, locations 460, 470 of visual references which include color-based information are identified by the object recognition algorithm, and the at least one vision system 204 omits the overlaying of images in areas 480, 490 of the pilot's view associated with the boundaries defined about the locations 460, 470 of these identified visual references.

Additionally or alternatively, in exemplary embodiments, the overlaid image may be modified to convey the color-based information in another manner. In exemplary embodiments, the at least one vision system 204 is configured to present a text marker together with the overlaid image in the area, the text marker being based on the color information associated with the visual reference stored in the navigation database 202.

Figure 5B:
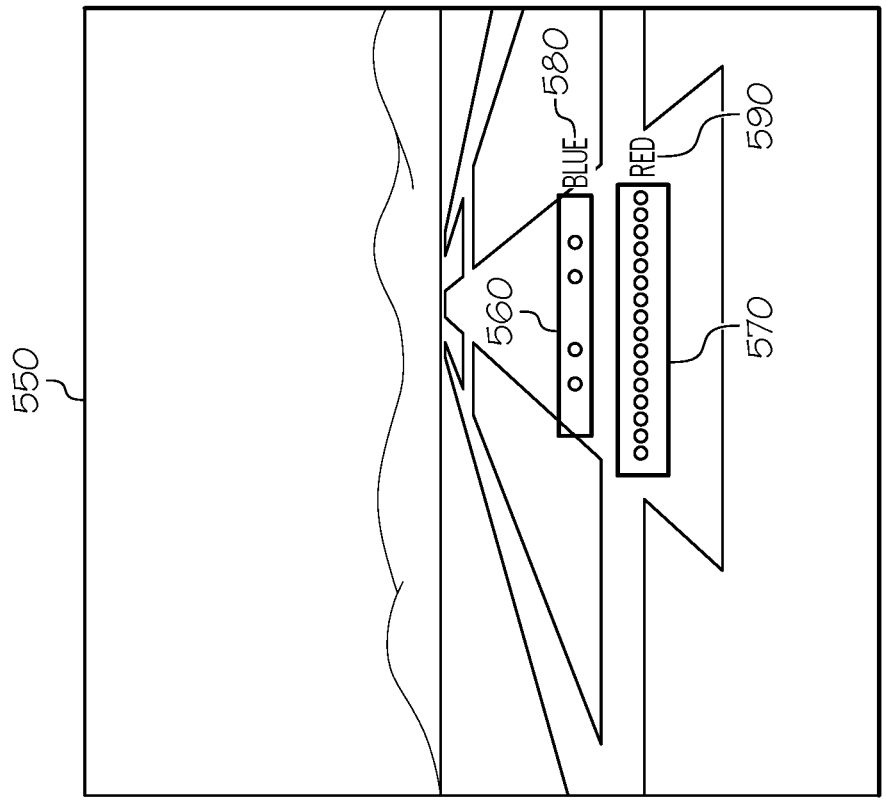
FIGS. 5A and 5B show another comparison between a conventional image generated by a vision system (FIG. 5A) and an image generated by a vision system of an aircraft display system in accordance with exemplary embodiments (FIG. 5B)
Figure 5A:
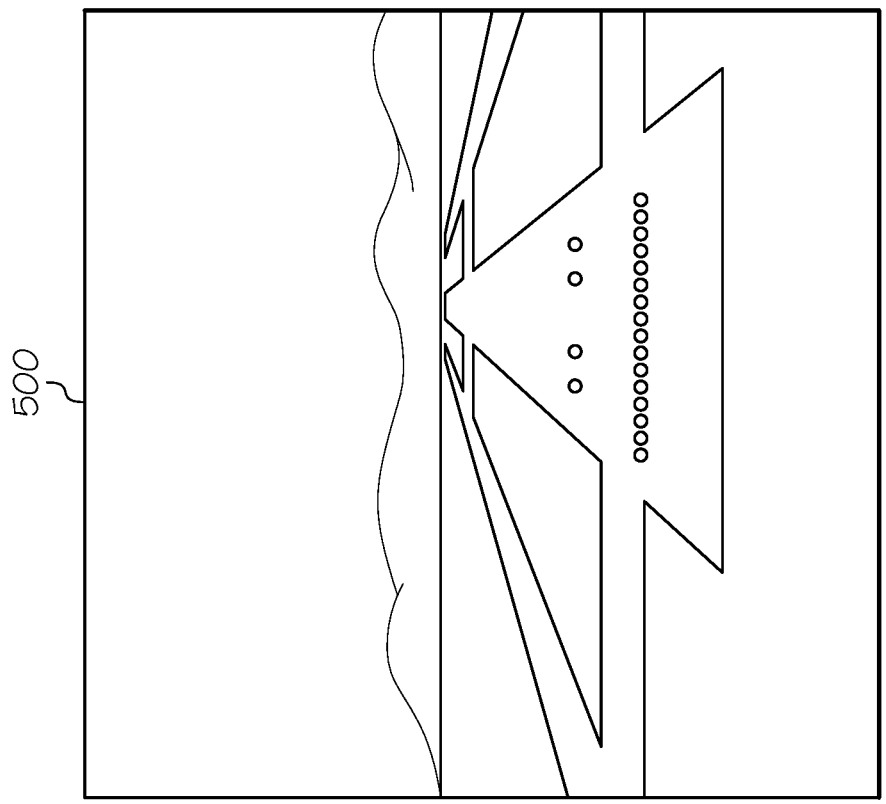

FIG. 5. shows a comparison between a conventional image a conventional image 500 generated by a conventional aircraft display system and an image 550 generated by an aircraft display system in accordance with exemplary embodiments. As can be seen in FIG. 5, in the conventional image 500, any visual references showing color-based information are obscured by overlaid images generated by the vision system. As can also be seen in FIG. 5, in the image 550 generated by an aircraft display system in accordance with exemplary embodiments, locations 560, 570 of visual references which include color-based information are detected, and the vision system 204 modifies the image 550 by displaying textual markers 580, 590 proximate to the boundaries of the identified visual references. In the example of FIG. 5, the textual marker "BLUE" is presented next to the visual reference location 560 that is stored in the navigation database as corresponding to a blue color, and the textual marker "RED" is presented next to the visual reference location 570 that is stored in the navigation database as corresponding to a red color. In alternative exemplary embodiments, other forms of marker (such as a number pre-determined to correspond to a specific color) may be displayed on the generated image. In alternative exemplary embodiments, an audio description of the color-based information may be conveyed to the pilot.

In an alternative embodiment, the information on the color of the color-based information and the type of the visual reference may be data linked to the aircraft using an appropriate communication mechanism from a ground-based information source. The at least one vision system 204 is configured to decode the unlinked message and modifies the overlaid image to convey this information to the pilot.

Figure 6:
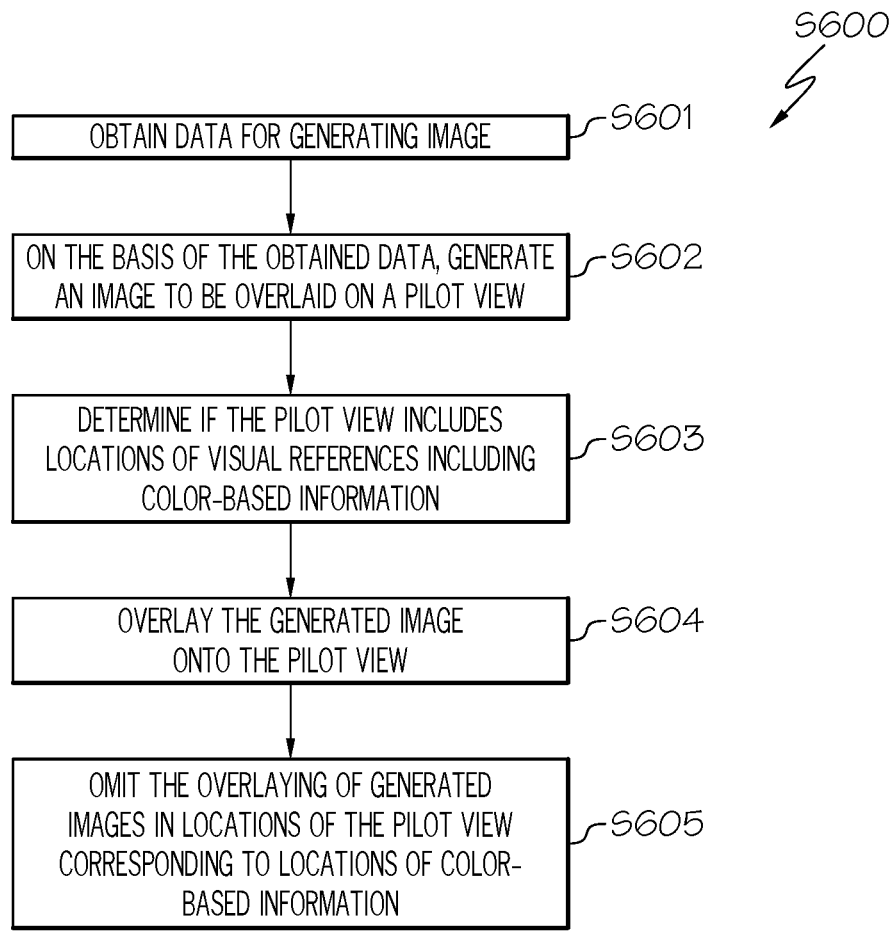
FIG. 6 shows a flowchart of a method in accordance with exemplary embodiments.

Referring now to FIG. 6, a flowchart of a method S600 for displaying images to a pilot is shown.

As step S601, data is obtained for generating an image. In exemplary embodiments, the data is obtained from a camera such as a night-vision camera or thermal camera. In exemplary embodiments, the data is obtained from a combination of sources, such as terrain and/or feature location information obtained from a navigation database and images from a night-vision or thermal camera. After the data is obtained, the method progresses to step S602.

At step S602, a translucent image to be displayed over a pilot view is generated using one or more vision systems. In exemplary embodiments, the one or more vision systems may include an enhanced vision system (EVS); a synthetic vision system (SVS); and/or a combined EVS/SVS. After generation of the image, the method progresses to step S603.

At step S603, it is determined, using the one or more visions systems and location information stored in a navigation database, whether the pilot view includes one or more locations of visual references including color-based information. This determination may be performed using an object recognition algorithm based on the expected location of stored visual references and image data obtained from the camera. Example visual references including color-based information include runway lighting, taxiway lighting, and other types of airport lighting. After the determination of whether the pilot view includes one or more locations of visual references including color-based information, the method progresses to step S604.

At step S604, the generated image is overlaid onto the pilot view, using a display module. In exemplary embodiments, the display module is a near-to-eye (NTE) display, such as a heads-up display (HUD) or a head-mounted display (HMD). The method then progresses to step S605.

At step S605, the translucent image is modified in order to convey the color-based information of the visual references to the pilot. In exemplary embodiments, the specific manner in which the translucent image is modified is by omitting areas of the pilot view from the translucent image, the omitted areas corresponding to pre-determined boundaries about the one or more locations in the pilot view of the sources of color-based information associated with the visual references. In this manner, the pilot is able to view the color-based information sources without these sources being obscured by the overlaid translucent image generated by the one or more vision systems.

Figure 7:
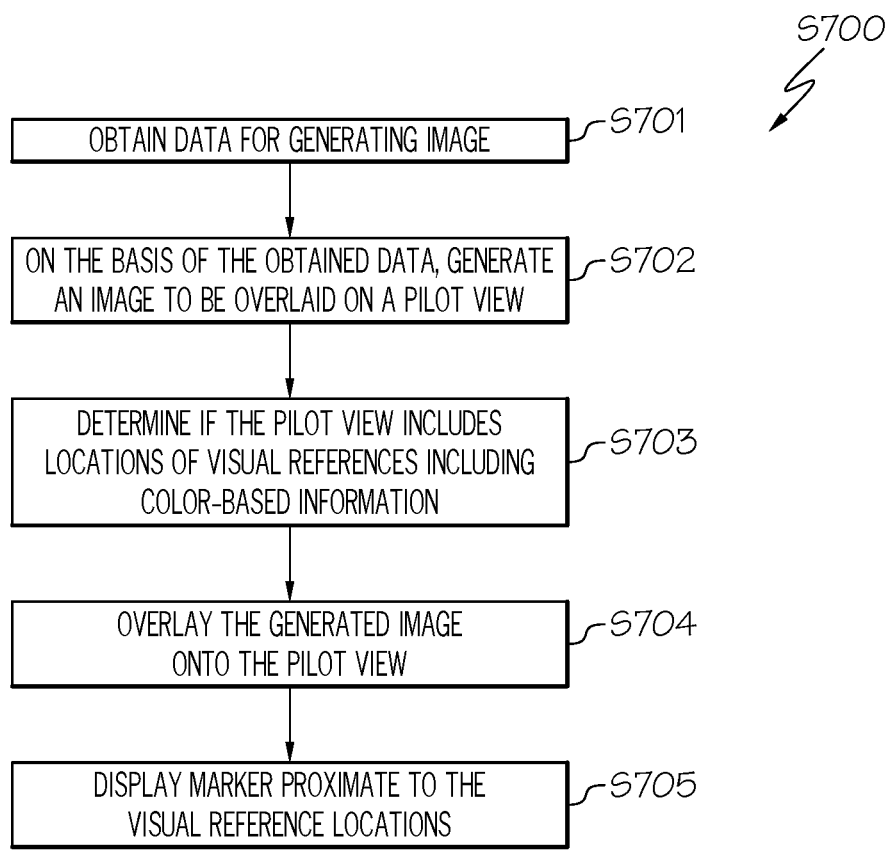
FIG. 7 shows another flowchart of a method in accordance with exemplary embodiments.

Turning to FIG. 7, a flowchart of a method S700 for displaying images to a pilot is shown.

As step S701, data is obtained for generating an image. In exemplary embodiments, the data is obtained from a camera such as a night-vision camera or thermal camera. In exemplary embodiments, the data is obtained from a combination of sources, such as terrain and/or feature location information obtained from a navigation database and images from a night-vision or thermal camera. After the data is obtained, the method progresses to step S702.

At step S702, an image to be displayed over a pilot view is generated using one or more vision systems. In exemplary embodiments, the one or more vision systems includes an enhanced vision system (EVS); a synthetic vision system (SVS); or a combined EVS/SVS. After generation of the image, the method progresses to step S703.

At step S703, it is determined, using the one or more visions systems and location information stored in a navigation database, whether the pilot view includes one or more locations of visual references including color-based information. Example visual references including color-based information include runway lighting, taxiway lighting, and other types of airport lighting. After the determination of whether the pilot view includes one or more locations of visual references including color-based information, the method progresses to step S704.

At step S704, the generated image is overlaid onto the pilot's view, using a display module. In exemplary embodiments, the display module is a near-to-eye (NTE) display, such as a heads-up display or a head-mounted display. The method then progresses to step S705.

At step S705, the translucent image is modified in order to convey the color-based information to the pilot. In step S705, the specific manner in which the translucent image is modified is by displaying a marker, using the display module, proximate to the visual reference location. The displayed marker indicates to the pilot the color of the color-based information associated with the visual reference. In exemplary embodiments, the displayed marker further indicates to the pilot the identified type of the visual reference, for example runway lighting, taxiway lighting, and so on.

While at least one exemplary embodiment has been presented in the foregoing detailed description, it should be appreciated that a vast number of variations exist. In particular, other techniques of presenting indications to the pilot regarding the color-based information of stored visual references exist, such as audio messages etc. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An avionic display system, comprising:
a display module for displaying an image overlaid on a pilot view;
a vision system in operable communication with the display module, the vision system configured to, by a processor, generate a translucent image and to cause the display module to overlay the generated translucent image on the pilot view; and
a navigation database in operable communication with the vision system, the navigation database configured to, by a processor, store information related to a location, boundary and color of a visual reference in the pilot view that would otherwise be obscured by the overlaid translucent image, the visual reference comprising a source of color-based information,
wherein the vision system is configured to, using the stored information related to the location, the boundary and color of the visual reference, modify the generated translucent image in the pilot view in order to convey the color-based information to the pilot, wherein the vision system is configured to modify the generated translucent image in the pilot view to convey the color-based information to the pilot by selectively omitting an area of the generated translucent image in the pilot view, the omitted area being selected based on the location and the boundary information of the visual reference.

2. The avionic display system of claim 1, wherein the vision system is configured to modify the generated translucent image in the pilot view to convey the color-based information to the pilot by displaying a marker proximate to the location of the visual reference in the pilot view, wherein a form of the marker is based on the color information of the visual reference in the pilot view.

3. The avionic display system of claim 2, wherein the marker comprises text.

4. The avionic display system of claim 2, wherein the vision system is further configured to convey the color information of the visual reference to the pilot by an audio description.

5. The avionic display system of claim 1, wherein the vision system comprises a vision system selected from the group consisting of: an enhanced vision system; a synthetic vision system; and a combined vision system including an enhanced vision system and a synthetic vision system.

6. The avionic display system of claim 1, wherein the vision system is configured to generate a monochrome translucent image.

7. The avionic display system of claim 1, wherein the display module comprises a near-to-eye display.

8. The avionic display system of claim 1, wherein the visual reference comprises airport lighting.

9. The avionic display system of claim 1, wherein the vision system is configured to vary a degree of translucency of the generated translucent image on the basis of determined visibility conditions.

10. A method of displaying images to a pilot, comprising:
generating, using a processor, a translucent image to be overlaid on top of a pilot view of a display;
determining, using a processor, if the pilot view includes one or more locations of stored visual references including sources of color-based information;
overlaying, using a processor, the translucent image on top of the pilot view; and
modifying the translucent image to convey the color-based information to the pilot, wherein the step of modifying the translucent image comprises omitting one or more selected areas of the translucent image, the one or more selected areas of the translucent image being determined based on stored location and boundary information associated with the one or more locations of stored visual references.

11. The method of claim 10, wherein the step of modifying the translucent image comprises displaying one or more markers next to the one or more locations of stored visual references, respectively, the markers being based on stored location and color information associated with the one or more visual references.

12. The method of claim 11, wherein the one or more markers comprise text markers.

13. The method of claim 10, wherein the translucent image is monochrome.

14. The method of claim 10, wherein at least one of the stored visual references comprises airport lighting.

15. The method of claim 10, further comprising the step of varying a degree of translucency of the generated translucent image on the basis of determined visibility conditions.

16. An avionic display system, comprising:
a display module for displaying an image overlaid on a pilot view, the display module comprising a near-to-eye display;
a vision system in operable communication with the display module, the vision system configured to, by a processor, generate a monochrome translucent image and to cause the display module to overlay the generated translucent image on the pilot view; and
a navigation database in operable communication with the vision system, the navigation database configured to, by a processor, store information related to a location, boundary and color of a visual reference in the pilot view that would otherwise be obscured by the overlaid translucent image, the visual reference comprising a source of color-based information,
wherein the vision system is configured to, using the stored information related to the location, the boundary and color of the visual reference, modify the generated translucent image in the pilot view in order to convey the color-based information to the pilot, wherein the vision system is configured to, by a processor, modify the generated translucent image in the pilot view to convey the color-based information to the pilot by selectively omitting an area of the generated translucent image in the pilot view which overlays the visual reference in the pilot view, the omitted area being selected based on the location and the boundary information of the visual reference.

* * * * *